Feb. 15, 1966         W. WOODHALL         3,235,332
              MANUFACTURE OF OXIDES
                Filed Dec. 12, 1961
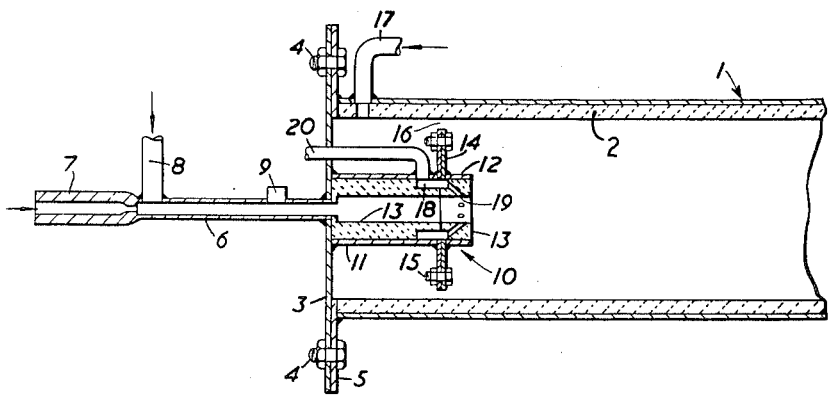
INVENTOR
William Woodhall
BY
ATTORNEYS United States Patent Office 3,235,332
Patented Feb. 15, 1966

3,235,332
MANUFACTURE OF OXIDES
William Woodhall, Grimsby, England, assignor to Laporte Titanium Limited, London, England, a company of Great Britain
Filed Dec. 12, 1961, Ser. No. 158,701
Claims priority, application Great Britain, Dec. 16, 1960, 43,453/60
6 Claims. (Cl. 23—202)

This invention relates to the manufacture of oxides of the elements titanium, zirconium, iron, aluminium and silicon by the oxidation of chlorides of the elements.

It has previously been proposed to manufacture titanium dioxide by introducing a mixture of titanium tetrachloride vapour, oxygen and carbon monoxide into a reaction vessel through a burner nozzle and igniting the mixture of carbon monoxide and oxygen issuing from the nozzle. Difficulty has been experienced, however, because the titanium dioxide formed tends to form a deposit on the burner nozzle and on the walls of the reaction vessel, and large crystals of titanium dioxide are liable to grow from the deposits. This is undesirable both because the burner nozzle tends to become blocked and because the formation of these large crystals reduces the yield of very small particles suitable for use as a pigment. Similar considerations apply if attempts are made to manufacture the other oxides referred to above by such a process.

This invention provides a process for the manufacture of an oxide of one of the elements titanium, zirconium, iron, aluminium and silicon by reacting a chloride of the element with an oxidising gas in the vapour phase, which comprises introducing the chloride and the oxidising gas into an elongated reaction chamber substantially at or close to one end thereof through gas inlet means in such manner that they form a generally conical stream of turbulent mixed gases that diverges from the gas inlet means and does not impinge on the chamber walls, heating the chloride and the oxidising gas to reaction temperature by incorporating with them a hot gaseous product that has been formed by reacting an oxidising gas with a fuel gas in the absence of the chloride and is introduced into the reaction chamber at or close to the said one end thereof, and passing chlorine, which has been produced by the reaction and recycled, through the chamber adjacent to the walls thereof in substantially laminar flow conditions to shield the walls from the chloride and from the hot oxide produced, the chloride being passed through the gas inlet means at a sufficiently high velocity and the region of incorporation of the said hot gaseous product and the first-mentioned oxidising gas with the chloride being situated so that the chloride reacts with the first-mentioned oxidising gas to form the oxide in the reaction chamber in a zone that is separated from the said gas inlet means and from the said region of incorporation by a region in which the chloride undergoes substantially no reaction.

Because thereaction zone in which the oxide is formed is separated from the gas inlet means and from the said region of incorporation by a region in which the chloride undergoes substantially no reaction, there is substantially no deposition of oxide on the gas inlet means. It is possible to arrange that such a region exists because, after the hot gaseous product has been incorporated with the reactants, some time elapses before the reactants reach reaction temperature and the reactants can travel a substantial distance during this time if their velocity is high. The fact that the divergent cone of gas leaving the gas inlet does not impinge on the walls of the chamber and that the walls of the chamber are shielded by chlorine ensures that there is at most very little deposition of oxide on the walls of the chamber.

An especially important form of the process is that in which the oxide produced is titanium dioxide and the chloride is titanium tetrachloride.

Advantageously, the oxidising gas that reacts with the chloride and the oxidising gas that reacts with the fuel gas are the same gas. Preferably, the oxidising gas is oxygen. The fuel gas is advantageously carbon monoxide.

The hot gaseous product may be incorporated with the chloride immediately prior to the introduction of the chloride into the reaction chamber.

Advantageously, the gas inlet means comprises two adjacent inlet openings, the chloride is introduced into the chamber through one of the inlet openings and the hot gaseous product is introduced into the chamber through the other of the inlet openings. The oxidising gas that reacts with the chloride may be introduced into the chamber in admixture with the chloride or, preferably, with the hot gaseous product. The inlet openings are preferably coaxial and the chloride is then preferably introduced into the chamber through the outer of the two inlet openings.

Advantageously, the chloride leaves the gas inlet means at a velocity of at least 100 feet per second.

The chloride may leave the gas inlet means at a velocity within the range of from 60 to 650 feet per second. Preferably, the chloride leaves the gas inlet means at a velocity of substantially 600 feet per second.

The oxide produced is in the form of a particulate suspension in the gas stream leaving the chamber. In the case of titanium dioxide, the particles may be of a size suitable for use as a pigment or they may be smaller than that. The particle size of the oxide produced may be controlled by controlling the concentration of the chloride in the reaction zone.

When the chloride is titanium tetrachloride and it is desired to promote the formation of titanium dioxide having the rutile crystallographic structure, aluminium chloride may be injected into the reaction zone or may be incorporated with the titanium tetrachloride prior to the introduction of the titanium tetrachloride into the reaction zone. Instead, finely divided aluminium metal may be incorporated with the fuel gas prior to the introduction of the fuel gas into the reaction chamber.

The chlorine that is used to shield the walls of the chamber from the chloride is preferably cooled after first leaving the reaction chamber and before being used for that purpose. Advantageously, the chlorine is cooled to a temperature not exceeding 700° C., and preferably to a temperature not exceeding 200° C. If desired, additional cold gas may be introduced into the chamber at one or more points to quench the reaction products and/or to limit the extent of growth of the oxide particles.

Advantageously, the chamber is tubular, the gas inlet means is situated at or close to one end of the chamber and is arranged so that the axis of the conical reaction zone is substantially parallel to, preferably substantially coincident with, the axis of the chamber, and the reaction products are withdrawn from the chamber at or close to the other end thereof. Advantageously, the chlorine used to shield the walls of the chamber is introduced into the chamber at or towards the end at or close to which the gas inlet means is situated and is withdrawn from the chamber in admixture with the gaseous reaction products. Preferably, the chlorine used to shield the walls of the chamber is drawn into the chamber by the injector action of the gas stream flowing along the chamber from the gas inlet means.

The process may conveniently be carried out using a tunnel burner, that is to say, the chamber may be a cylindrical refractory-lined vessel and the gas inlet means may comprise a short refractory-lined tube that is coaxial with the vessel and extends within the vessel a short distance from one end thereof and terminates with an open inner end from which the cone of gas diverges. Gas is supplied to the short tube through a mixing tube that leads to a central aperture in the otherwise closed outer end of the short tube. The fuel gas may be drawn into the mixing tube by injector means using the flow of oxidising gas to produce the required injector effect.

The included angle of the cone of gas issuing from the open inner end of the short tube using a conventional tunnel burner is approximately 10 to 15°, depending on the internal dimensions of the short tube. The internal diameter of the cylindrical vessel should be so chosen that, having regard to the included angle of the cone the reactants are quenched in the region of the wall of the cylindrical vessel at such a period after leaving the short tube that the oxide particles formed have the desired particle size. Other conditions remaining the same, the particle size increases as this time increases. Thus, this provides a second method of controlling the particle size of the oxide produced. Usually, the internal diameter of the cylindrical vessel will be required to be within the range of from 10 to 100 times the internal diameter of the short tube.

Advantageously, the parts of the tunnel burner that are exposed to chlorine and that are not constructed of a refractory material are constructed of nickel. Instead of using a refractory lined vessel a cylindrical vessel constructed of nickel may be used which is cooled externally to maintain the temperature of the inner surface of the vessel at a temperature not exceeding 500° C.

The following example illustrates the invention.

Titanium dioxide was produced using the apparatus shown in the accompanying drawing, which is an axial section. Referring to the drawing, the apparatus is in the form of a tunnel burner which comprises a reaction tube of circular cross-section, which is indicated generally by the reference number 1 and of which a part only is shown. The tube 1 is formed of nickel with a lining 2 of refractory material on its inner surface. One end of the tube 1 is closed by a circular nickel plate 3 which is bolted at 4 to an annular flange 5 which extends radially outwardly from that end of the tube 1. The tube 1 is 4 feet in length and has an internal diameter of 10 inches.

The plate 3 has a central circular aperture of approximately 1 inch diameter. Secured to the plate 3 and extending axially outward from the inner surface of the plate 3 through the aperture is a gas inlet pipe 6. At the end of the pipe 6 remote from the plate 3, the pipe 6 is integral with an axially extending injector nozzle 7. Close to the nozzle 7, a branch pipe 8 leads to an opening in the wall of the pipe 6. Positioned along the pipe 6 towards the end thereof secured to the plate 3 is a short tapping tube 9 adapted to receive a spark plug.

Extending coaxially within the tube 1 from the plate 3 is a short nickel tube of circular cross-section which is indicated generally by the reference numeral 10 and which is secured to the plate 3.

The short tube 10 is formed of two tubular sections 11 and 12, each of which has a refractory lining 13 on its inner surface. The two sections 11 and 12 are secured together by means of outwardly extending flanges 14 bolted together at 15. The short tube 10 communicates with the interior of the tube 1 and with the bore of the pipe 6, so that the short tube 10 and the pipe 6 together form a conduit enabling gas to be supplied to the interior of the tube 1 from the injector nozzle 7 and the branch pipe 8.

The annular flanges 14 are radially separated from the inner refractory lining 2 of the tube 1 by an annular gap 16 of ½ inch width. An inlet pipe 17 communicates with that portion of the interior of the tube 1 which is situated between the plate 3 and the annular flanges 14. This portion forms a wind box so that gas introduced into the tube 1 through the pipe 17 becomes substantially uniformly distributed around the inner circumference of the tube 1 before it passes through the annular gap 16.

The refractory lining 13 of the sections 11 and 12 over a radially outward region that extends axially a short distance from the abutting ends of the sections 11 and 12 is cut away to form, in the assembled short tube 10, a space 18 of annular cross-section. Extending inwardly towards the axis of the short tube 10 from the end of the space 18 that is situated in the section 12 are twenty straight bores 19 of 1/16 inch diameter. These bores are uniformly positioned around the axis of the short tube 10 and their axes lie in the surface of an imaginary cone which tapers in a downstream direction. (For the sake of clarity, a few only of the bores 19 are shown in the drawing.)

Communicating with the space 18 at the end thereof remote from the bores 19 is a gas inlet pipe 20 constructed of nickel which is joined to the wall of the short tube 10.

The pipe 20 is bent through an angle of 90° close to the outer wall of the short tube 10 and passes parallel to the axis of the short tube 10 and leaves the interior of the tube 1 through an aperture in the plate 3 to which the pipe 20 is sealed. The pipe 20 enables gas to be supplied to the interior of the tube 1 through the space 18, the bores 19, and the inner end portion of the short tube 10.

Carbon monoxide was drawn through the branch pipe 8 into the pipe 6 at a rate of 250 cubic feet per hour (measured at N.T.P.) by means of a mixture of air and oxygen introduced into the pipe 6 through the injector nozzle 7 at a rate of 600 cubic feet per hour (measured at N.T.P.) This rate of introduction of the mixture of air and oxygen corresponded to a rate of introduction of air of 440 cubic feet per hour and a rate of introduction of additional oxygen of 160 cubic feet per hour. The gaseous mixture was ignited by a spark plug inserted into the short tapping tube 9 and the carbon monoxide burned in a region of the interior of the short tube 10 close to the entrance thereof.

Cold air was introduced through the pipe 17 into the interior of the tube 1 at a rate of 1600 cubic feet per hour (measured at N.T.P.) and it flowed through the annular gap 16 and along the walls of the tube 1 to shield the walls.

When the temperature within the tube 1 reached 1100° C., titanium tetrachloride vapour at a temperature of 150° C. was introduced through the pipe 20, the space 18, and the bores 19 into the gas stream passing through the short tube 10. The rate of introduction of the titanium tetrachloride vapour was equivalent to 3 gallons per hour of liquid titanium tetrachloride.

The velocity at which the gases issued from the end of the short tube 10 was 330 feet per second and the gases formed a generally conical stream of turbulent gas which did not impinge on the walls of the tube 1.

The titanium tetrachloride reacted within the tube 1 with the oxygen present in the gas stream to form titanium dioxide. The gas stream leaving the end of the tube 1 and containing in suspension titanium dioxide particles was passed into a refractory lined cyclone separator wherein the titanium dioxide particles were separated from the gas stream. The gases leaving the cyclone separator were at a temperature of 650° C. and were then cooled to a temperature of 200° C. When the reaction had started, the air initially fed to the inlet pipe 17 was replaced by the cooled product gases, which were fed at the same rate as the air (1,600 cubic feet per hour measured at N.T.P.) and which served to shield and cool the inner surface of the lining 2 of the tube. The rate of introduction of the recycled gas was such that the flow of the gas along the inner surface of the lining 2 of the tube 1 was substantially laminar.

The titanium dioxide produced had an average particle size of 0.19 micron and was suitable for further treatment to produce pigmentary grade titanium dioxide.

The process was stopped after a period of 1 hour and the interior of the tunnel burner was inspected. The walls of the lining 2 of the tube 1 were found to be substantially free of titanium dioxide growth, which showed that the conical stream of turbulent gases did not impinge directly on the walls. The end portion of the short tube 10 was found to have substantially no titanium dioxide deposited thereon, showing that no substantial reaction of the titanium tetrachloride and oxygen had occurred in the immediate vicinity of the short tube 10.

I claim:

1. A process for the production of an oxide of an element selected from the group consisting of titanium, zirconium, iron, aluminum and silicon by reacting a vaporous chloride of said element with an oxidizing gas in an elongated reaction zone which comprises passing cold air along the limiting internal surface of the reaction zone in substantially laminar flow to shield said surface, combining a fuel gas with a flowing stream of an oxidizing gas, igniting the combined gases in the absence of said chloride to form a hot gaseous product, thereafter incorporating said hot gaseous product with said vaporous chloride and a further amount of an oxidizing gas and introducing the resulting gaseous mixture into said reaction zone near one end thereof at a velocity within the range of about 60 to 650 feet per second and in the form of a conical stream having an included angle of 10°–15° whereby said chloride and further amount of oxodizing gas react to form a suspension of product oxide in by-product gases, said velocity being such that oxide forming temperature is reached only in a region of the reaction zone which is remote from its gas entrance end, separating said by product gases from said product oxide, and passing said separated by product gases through said reaction zone in place of said cold air.

2. A process as set forth in claim 1 wherein the separated reaction product gases are cooled to a temperature below 700° C. prior to passage through the reaction zone.

3. A process as set forth in claim 1 wherein finely divided aluminum metal is incorporated with the fuel gas prior to the reaction of said fuel gas with said oxidizing gas.

4. A process for the production of titanium dioxide by reacting vaporous titanium tetrachloride with an oxidizing gas in an elongated reaction zone which comprises passing cold air along the limiting internal surface of the reaction zone in substantially laminar flow to shield said surface, combining carbon monoxide with a flowing stream of an oxidizing gas, igniting the combined gases in the absence of said titanium tetrachloride to form a hot gaseous product, thereafter incorporating said hot gaseous product with said vaporous titanium tetrachloride and a further amount of an oxidizing gas and introducing the resulting gaseous mixture into said reaction zone near one end thereof at a velocity within the range of about 60 to 650 feet per second and in the form of a conical stream having an included angle of 10°–15° whereby said titanium tetrachloride and further amount of oxidizing gas react to form a suspension of titanium dioxide in by-product gases, said velocity being such that titanium dioxide forming temperature is reached only in a region of the reaction zone which is remote from its gas entrance end, separating said by-product gases from said titanium dioxide, and passing said separated by-product gases through said reaction zone in place of said cold air.

5. A process as set forth in claim 4 wherein aluminum chloride vapor is incorporated with the titanium tetrachloride vapor prior to the introduction of said titanium tetrachloride vapor into said reaction zone.

6. A process for the production of an oxide of an element selected from the group consisting of titanium, zirconium, iron, aluminum and silicon by reacting a vaporous chloride of said element with an oxidizing gas in an elongated reaction zone which comprises passing cold air along the limiting internal surface of the reaction zone in substantially laminar flow to shield said surface, introducing said vaporous chloride of said element and an excess of an oxidizing gas as hereinafter defined into said reaction zone near one end thereof in the form of a conical stream having an included angle of 10°–15°, heating said chloride and said excess oxidizing gas to a temperature where a suspension of product oxide and by-product gases is formed by introducing into said reaction zone near said one end thereof and incorporating with said chloride and said excess oxidizing gas the hot gaseous combustion product including excess oxidizing gas resulting from igniting a fuel gas with an excess of oxidizing gas in the absence of said chloride, said chloride being introduced into said reaction zone at a velocity within the range of about 60 to 650 feet per second and the incorporation of said hot gaseous combustion product and the excess oxidizing gas with said chloride occurring only in a region of the reaction zone which is remote from the gas entrance end, separating said by-product gases from said product oxide, and passing said separated by-product gases through said reaction zone in place of said cold air.

References Cited by the Examiner

UNITED STATES PATENTS

| | | | |
|---|---|---|---|
| 2,653,078 | 9/1953 | Lane | 23—139 |
| 2,670,275 | 2/1954 | Olson et al. | 23—140 X |
| 2,915,367 | 12/1959 | Olson et al. | 23—202 |
| 2,957,753 | 10/1960 | Nelson et al. | 23—202 |

MAURICE A. BRINDISI, *Primary Examiner.*